(12) United States Patent
Matsumoto et al.

(10) Patent No.: US 9,727,220 B2
(45) Date of Patent: Aug. 8, 2017

(54) DEVICE HAVING TOUCH PANEL, RADAR APPARATUS, PLOTTER APPARATUS, SHIP NETWORK SYSTEM, INFORMATION DISPLAYING METHOD AND INFORMATION DISPLAYING PROGRAM

(75) Inventors: Hiroaki Matsumoto, Nishinomiya (JP); Tatsuya Asahara, Nishinomiya (JP); Masashi Ohhora, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 515 days.

(21) Appl. No.: 14/349,322

(22) PCT Filed: Oct. 3, 2011

(86) PCT No.: PCT/JP2011/005581
§ 371 (c)(1),
(2), (4) Date: Apr. 2, 2014

(87) PCT Pub. No.: WO2013/051051
PCT Pub. Date: Apr. 11, 2013

(65) Prior Publication Data
US 2014/0250401 A1     Sep. 4, 2014

(51) Int. Cl.
*G06F 3/048* (2013.01)
*G06F 3/0484* (2013.01)
*G06F 3/0488* (2013.01)

(52) U.S. Cl.
CPC ........ *G06F 3/04847* (2013.01); *G06F 3/0488* (2013.01)

(58) Field of Classification Search
None
See application file for complete search history.

(56) References Cited

U.S. PATENT DOCUMENTS 8,130,271 B2 *   3/2012  Imamura ............ B60R 1/00
                                                       348/148
2011/0242136 A1 * 10/2011  Yamada ............ G01C 21/367
                                                       345/660

FOREIGN PATENT DOCUMENTS

| JP | 454629 A | 2/1992 |
| JP | 8105954 A | 4/1996 |
| JP | 200681854 A | 3/2006 |
| JP | 2011170598 A | 9/2011 |

OTHER PUBLICATIONS

ISA Japanese Patent Office, International Search Report of PCT/JP2011/005581, Dec. 6, 2011, WIPO, 3 pages.

\* cited by examiner

*Primary Examiner* — Jeffrey A Gaffin
*Assistant Examiner* — Ayesha Huertas Torres
(74) *Attorney, Agent, or Firm* — Alleman Hall Creasman & Tuttle LLP (57) ABSTRACT

A touch panel device includes a display unit, a detector, and a controller. The display unit displays an image (nautical chart) on a display screen. The detector detects touches at two positions on the display screen and touched positions thereof. The controller displays a distance and azimuths between the touched positions, based on the two touched positions that are detected by the detector and either one of coordinates on the image corresponding to the touched positions and information associated with the coordinates (positional information).

12 Claims, 9 Drawing Sheets

DEVICE HAVING TOUCH PANEL, RADAR APPARATUS, PLOTTER APPARATUS, SHIP NETWORK SYSTEM, INFORMATION DISPLAYING METHOD AND INFORMATION DISPLAYING PROGRAM

TECHNICAL FIELD

The present invention mainly relates to a device having a touch panel, which is able to detect touches at two positions.

BACKGROUND ART

Conventionally, as disclosed in Patent Document 1, a display device, such as a radar device, has been known, which has a function to display a VRM (Variable Range Marker) and an EBL (Electronic Bearing Line) on a display screen. The VRM is a range ring used for measuring a distance to an object on the display screen, and an operator can grasp a distance from a ship to an observed position by referring to the VRM. The EBL is an azimuth line used for measuring an azimuth of the object on the display screen, and the user can grasp the azimuth of the observed position seen from the ship by referring to the EBL.

Moreover, with a display device for displaying a nautical chart and the like, in a case of displaying a distance and azimuths between two positions, an operator first uses a cursor key, a trackball or the like to move a pointer, and selects a single position (reference position) on the nautical chart. Next, the operator performs operation of shifting to a mode in which the distance and the like are displayed. When the pointer is moved after the mode shifting, for example, the distance from the reference position to the position of the pointer and the azimuth of the position of the pointer seen from the reference position are displayed on the display screen.

REFERENCE DOCUMENTS OF CONVENTIONAL ART

Patent Document(s)

Patent Document 1: JP1996-105954A

DISCLOSURE OF THE INVENTION

Problems to be Solved by the Invention

However, with the display device of, for example, Patent Document 1 for displaying a radar image, work of adjusting, for example, a diameter of the VRM and an inclination of the EBL is needed to grasp the distance and the azimuth of the observed position. This adjusting work is troublesome since an object to adjust needs to be selected and an adjusting amount needs to be inputted.

On the other hand, with the display device for displaying the nautical chart and the like, a plurality of times of operations are needed to obtain the distance and the azimuths between the two positions. Moreover, in a case of obtaining the distance and the like by fixing the reference position, it is only required to move the pointer; however, in a case of changing the reference point, it is required to perform the plurality of times of operations again.

As described above, complicated operations are required to obtain, for example, the distance between the two positions on the radar image or the nautical chart. Such complicated operations do not suit a device having a touch panel with which instinctive operation is generally required, and there has been a room for improvement.

The present invention is made in view of the above situations and aims to provide a device having a touch panel, which is able to display information between two positions on an image (e.g., a nautical chart) with simple operation.

SUMMARY AND EFFECT(S) OF THE INVENTION

Problems to be solved by the present invention are described above, and means for solving the problems and effects thereof will be described below.

According to a first aspect of the present invention, a device having a touch panel with the following configuration is provided. That is, the device having the touch panel includes a display unit, a detector, and a controller. The display unit displays an image on a display screen. The detector detects touches at two positions on the display screen and touched positions thereof. The controller displays, on the display screen, point-to-point information indicating relation of information between the touched positions, based on the two touched positions that are detected by the detector and either one of coordinates on the image corresponding to the touched positions and information associated with the coordinates.

Thus, the point-to-point information can be displayed with the simple operation. Moreover, since the touch panel device is configured to specify the positions with the touch operation, an operator can grasp the relation between the two positions with instinctive operation.

With the above device having the touch panel, when the detector detects a change of one or more of the touched positions, the controller is preferred to display the point-to-point information on the display unit based on the changed one or more of the touched positions.

Thus, even if the operator touches positions which are away from desired positions by mistake, he/she can obtain the point-to-point information between the desired positions by moving the touched positions.

With the above device having the touch panel, the controller is preferred to display, at least between the two positions, a scale indicating a value of the information associated with the coordinates.

Thus, the operator can grasp, not only the relation between the two positions, but also how the information changes from the first position to the second position.

With the above device having the touch panel, when the detector no longer detects either one of the touch at one of the two positions and the touches at the two positions, the controller is preferred to erase the point-to-point information from the display unit.

Thus, the point-to-point information can instantly be changed to be not displayed, and therefore, suitable action can be provided even in a case where it is needed to check the display screen urgently.

With the above device having the touch panel, it is preferred to have the following configuration. That is, the display unit displays either one of a map and a nautical chart. The controller displays on the display screen, as the point-to-point information, a distance from one of the touched positions to the other touched position and an azimuth indicated by a line coupling the two touched positions.

Thus, the operator can find out the distance and the like between the two positions on either one of the map and the nautical chart, and therefore, for example, a distance and the like from a departing point to a destination can be acquired.

With the above device having the touch panel, it is preferred to have the following configuration. That is, the display unit displays either one of a map and a nautical chart. The controller includes the touch panel characterized to display on the display screen, as the point-to-point information, a period of time required to move a distance from one of the touched positions to the other touched position.

Thus, the operator can find out the required period of time to move the distance between the two positions on either one of the map and the nautical chart, and therefore, for example, a period of time until reaching a destination can be acquired.

With the above device having the touch panel, it is preferred to have the following configuration. That is, the device having the touch panel includes a memory configured to store nautical chart information. The controller displays a position of a ship on a nautical chart based on positional information received from a GNSS sensor.

Thus, the operator can acquire the distance and the like from the position of the ship to the destination.

According to other aspects of the present invention, a radar apparatus, a plotter apparatus, and a ship network system each including the device having the touch panel, are provided.

Thus, the effects of the present invention can be exerted with radar apparatuses, plotter apparatuses, and ship network systems.

According to a second aspect of the present invention, the following information displaying method is provided. That is, the information displaying method includes: displaying an image on a display screen; detecting touches at two positions on the display screen and touched positions thereof; and displaying point-to-point information indicating relation of information between the touched positions, based on the two touched positions that are detected by the detecting the touches and either one of coordinates on the image corresponding to the touched positions and information associated with the coordinates.

Thus, the point-to-point information can be displayed with the simple operation. Moreover, since the touch panel device is configured to specify the positions with the touch operation, an operator can grasp the relation between the two positions with instinctive operation.

According to a third aspect of the present invention, a information displaying program having the following configuration is provided. That is, the information displaying program causes a computer to: display an image on a display screen; detect touches at two positions on the display screen and touched positions thereof; and display point-to-point information indicating relation of the information between the touched positions, based on the two touched positions that are detected by the detecting the touches and either one of coordinates on the image corresponding to the touched positions and information associated with the coordinates.

Thus, the point-to-point information can be displayed with the simple operation. Moreover, since the touch panel device is configured to specify the positions with the touch operation, an operator can grasp the relation between the two positions with instinctive operation.

MODE(S) FOR CARRYING OUT THE INVENTION

Figure 1:
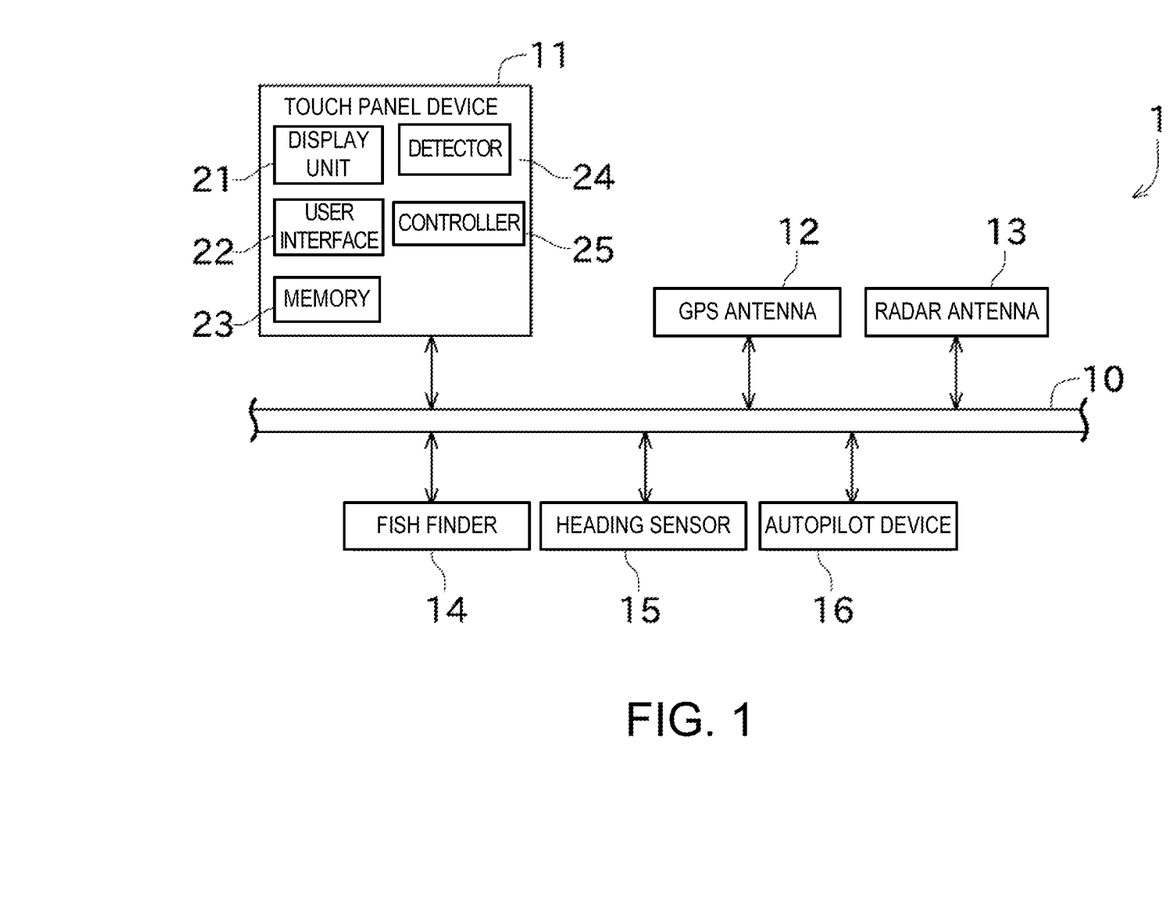
FIG. 1 is a block diagram illustrating an overall configuration of a ship instrument network system.
Figure 2:
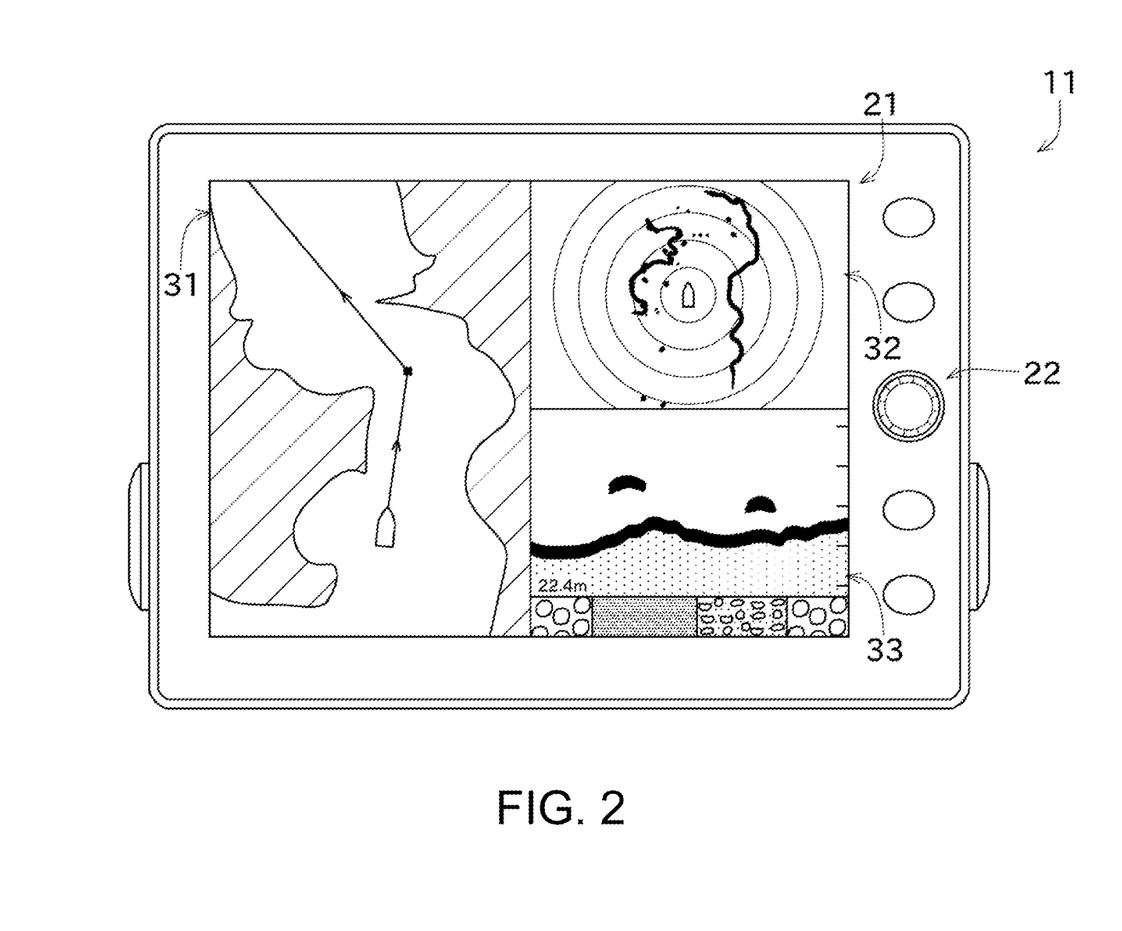
FIG. 2 is a front view of a touch panel device.

Next, one embodiment of the present invention is described with reference to the drawings. FIG. 1 is a block diagram illustrating an overall configuration of a ship instrument network system 1. FIG. 2 is a front view of a touch panel device 11.

The ship instrument network system 1 of this embodiment includes a plurality of ship instruments connected to a ship network 10. The ship instruments can exchange, for example, detected information via the ship network 10. As the standard of the ship network 10, LAN (Local Area Network) or CAN (Controller Area Network) can be adopted, for example.

As illustrated in FIG. 1, the ship instrument network system 1 of this embodiment includes a device having a touch panel (hereinafter, simply be referred to as the touch panel device) (information display device) 11, a GPS antenna (GNSS sensor) 12, a radar antenna 13, a fish finder (acoustic sensor) 14, a heading sensor 15, and an autopilot device 16.

The touch panel device 11 is configured to create and display an image (sensor image) based on information detected by the other ship instruments (sensors), detect a touch operation on a display screen, and perform processing according to the detection result. Specifically, the touch panel device 11 includes a display unit 21, a user interface 22, a memory 23, a detector 24, and a controller 25.

The display unit 21 is comprised of, for example, a liquid crystal display, and can display the sensor image, various setting screens and the like on the display screen as described above.

The user interface 22 is comprised of, for example, a rotary key to which a clockwise or counterclockwise rotational operation can be performed, and a hardware key, such as a menu key or the like for calling out a menu screen. Note that, with the touch panel device 11, input and instruction can be performed by touch operation on the display screen. Therefore, the number of keys of the user interface 22 can be reduced.

The memory 23 stores, for example, contents of program(s) to be executed by the controller 25, nautical chart information, and navigation route(s) set by an operator.

The detector 24 detects the touch operation performed on the display screen by the operator. In this embodiment, a projected capacitance system is used as a system for detecting the touch operation. This system is configured such that a plurality of electrodes with high transparency are disposed on a display panel and a touched position is detected based on a change of an electric capacity of each electrode caused when a fingertip approaches the panel. With this configuration, not only the touched position but also a finger motion in a touching state (change of the touched position) can be detected. Moreover, when two or more positions are touched simultaneously, the detector 24 can also detect the respective touched positions and changes of the respective touched positions. The touched position(s) and the change of the touched position(s) detected by the detector 24 are outputted to the controller 25. Note that, the system for detecting the touch operation is not limited to the projected capacitance system, and any other suitable system may be adopted. Moreover, other than the touch operation by a finger, a configuration in which a touch operation performed by a tapered stick-like member is detected may be adopted, for example.

The controller 25 creates the sensor image (a radar image, a nautical chart around the ship, etc.) based on stored contents in the memory 23 and information received from other ship instrument(s), and displays it on the display unit 21. The controller 25 receives information from a plurality of ship instruments and creates a plurality of sensor images. The controller 25 can switch a screen mode between a mode for displaying only one of the plurality of sensor images on the display screen (full screen mode) and a mode for dividing the display screen and displaying a plurality of sensor images thereon (divided screen mode, see FIG. 2).

Moreover, the controller 25 performs matching between the change of the touched position detected by the detector 24 and predetermined touch operation contents (touch gestures), and thereby, identifies which touch gesture is performed by the operator. Then, the controller 25 performs processing corresponding to the identified touch gesture.

One specific example of the touch gestures includes a "drag operation." The drag operation is a touch gesture of moving a touching finger (normally one finger) on the display screen to a predetermined direction without separating it from the display screen. Scrolling of the image is normally associated with this drag operation. Note that, the drag operation also includes an operation of quickly moving the finger while touching the display screen (flick operation), and the like. Moreover, another example of the touch gestures includes a "pinch operation." The pinch operation is an operation of, without separating two touching fingers from the display screen, bringing the fingers close to each other (pinch in) or separating them from each other (pinch out). Processing of changing a scale of the image is normally associated with this pinch operation. Note that, the controller 25 can also identify other various touch gestures than the examples given above.

The GPS antenna 12 receives positioning signals from GPS satellites (GNSS satellites) and outputs them to, for example, the touch panel device 11 via the ship network 10. The controller 25 of the touch panel device 11 obtains a location of the ship (specifically, a location of the GPS antenna and a terrestrial reference absolute position) based on the positioning signals. Note that, a configuration in which the calculation for obtaining the location based on the positioning signals is performed on the GPS antenna 12 side and the ship location is outputted to the touch panel device 11 may be adopted.

The touch panel device 11 can exert a function as a navigation device based on the obtained ship location and the nautical chart information stored in the memory 23. Specifically, based on the acquired ship location and the nautical chart information stored in the memory 23, the controller 25 can superimpose the ship location on the nautical chart and display it on the display unit 21. Moreover, the controller 25 can obtain a ground speed and a trace of the ship by utilizing the ship location which changes with time, and display them on the display unit 21. Further, the controller 25 can create a navigation route and display it on the display unit 21 based on the operator's selecting of a destination and a waypoint (stopover point) with the touch operation (see a first sensor image 31 illustrated in FIG. 2).

The radar antenna 13 transmits a microwave and receives a reflection wave from an object. The reflection wave is suitably signal-processed and then outputted to the touch panel device 11. The touch panel device 11 creates a radar image based on the reflection wave. Specifically, the controller 25 of the touch panel device 11 obtains a distance of the object based on a time length from the transmission of the microwave to the reception of the reflection wave. Moreover, the controller 25 obtains a direction in which the object exists, based on a direction to which the microwave is transmitted. The controller 25 creates the radar image as described above and displays it on the display unit 21 (see a second sensor image 32 illustrated in FIG. 2).

The fish finder 14 is comprised of a transducer and an analyzer. The transducer is installed in, for example, the bottom of the ship, and discharges an ultrasonic wave directly below into the sea and receives the reflection wave from the sea bottom or a school of fish. The analyzer creates fish finding data (data acquired by the fish finder and data of the school of fish or the sea bottom) based on the reflection wave. Moreover, the fish finder 14 of this embodiment has a function to determine a state of the sea bottom (bottom sediment type) based on the acquired fish finding data. Specifically, the analyzer can determine which kind the sea bottom falls in with higher possibility, among rocks, gravel (stones), sand, and mud, by analyzing the received reflection wave. The fish finding data and the determined bottom sediment type are outputted to the touch panel device 11. Then, the controller 25 of the touch panel device 11 creates a third sensor image 33 based on the received data (see FIG. 2) and displays it on the display unit 21. In the third sensor image 33, the vertical axis indicates the fish finding data and the horizontal axis indicates a timing at which the fish finding data is acquired (the data is older as it goes toward the left end of the display screen).

The heading sensor 15 is configured to detect a heading of the ship (a direction to which a bow of the ship is heading) by a terrestrial reference absolute position. Generally, a ship travels forward, toward its bow direction. Therefore, it can be said that the heading sensor 15 detects an azimuth of the forward direction of the hull of the ship. For example, a magnetic azimuth sensor or a GPS compass may be used as the heading sensor 15.

The autopilot device 16 is a device for automatically controlling a rudder so that the ship travels along the set navigation route. Specifically, the autopilot device 16 obtains how much the bow of the ship is to be changed based on the heading acquired from the heading sensor 15 and the navigation route acquired from the touch panel device 11. Then, the autopilot device 16 matches the course of the ship with the navigation route by changing an angle of the rudder according to the obtained value.

The ship instrument network system 1 of this embodiment is configured as described above. Note that, the ship instruments constituting the ship instrument network system 1 are arbitrary, and a configuration in which ship instrument(s) other than those described above are connected, or a configuration in which a plurality of similar types of ship instruments are connected may be adopted. Moreover, a configuration in which the processing of the data acquired by the ship instruments is performed by the ship instrument concerned may be adopted, or a configuration in which the processing of the data acquired by the ship instruments is performed by the controller 25 of the touch panel device 11 may be adopted.

Figure 3:
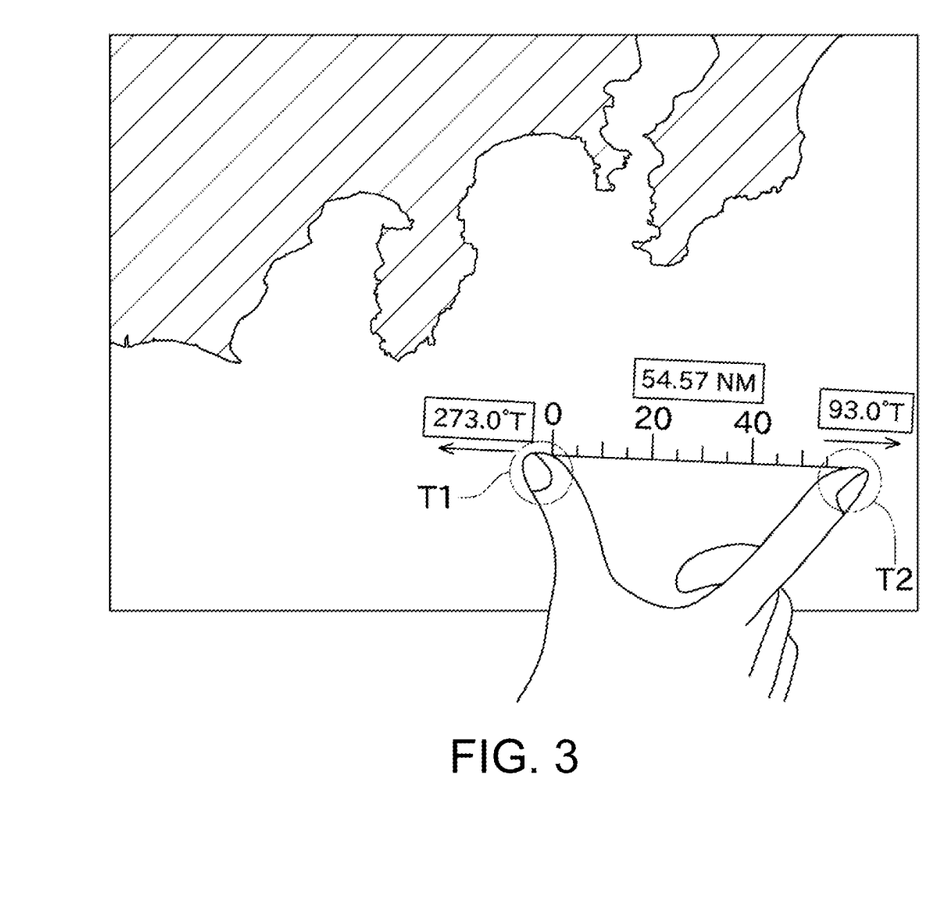
FIG. 3 is a view illustrating a display screen when point-to-point information is displayed.
Figure 4:
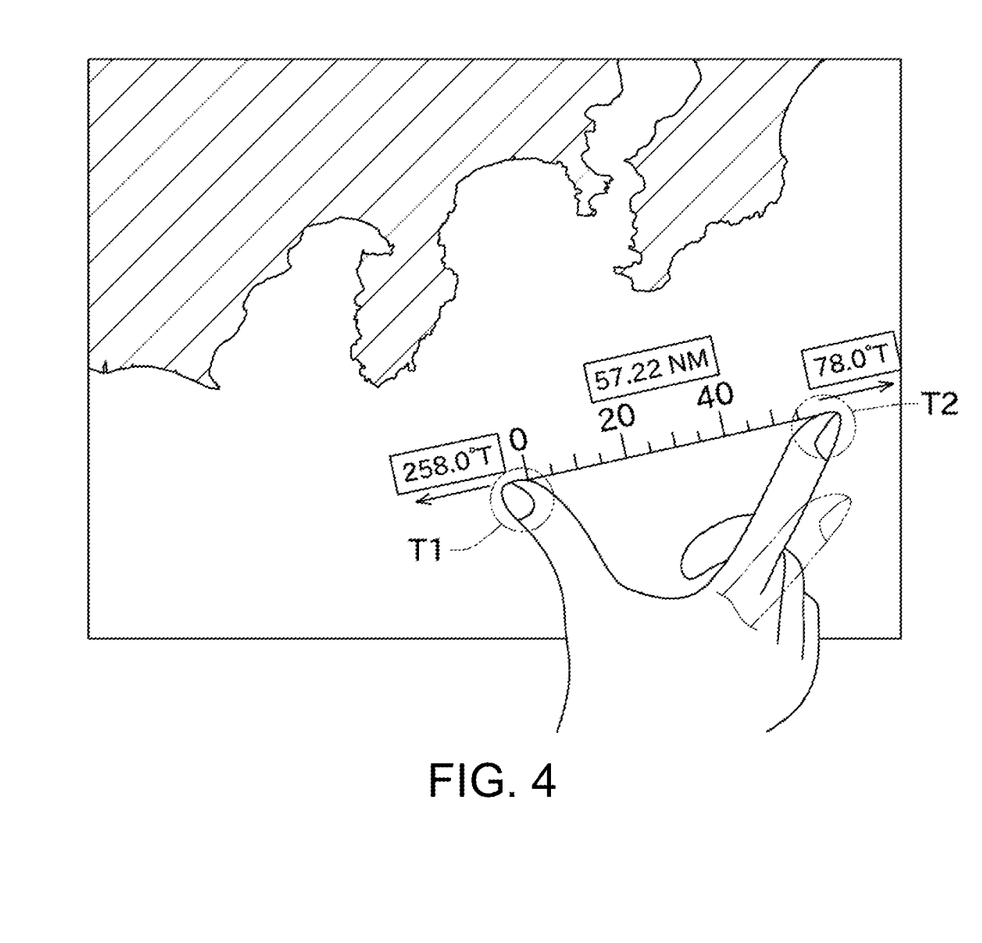
FIG. 4 is a view illustrating the display screen when one of touches is moved.
Figure 5:
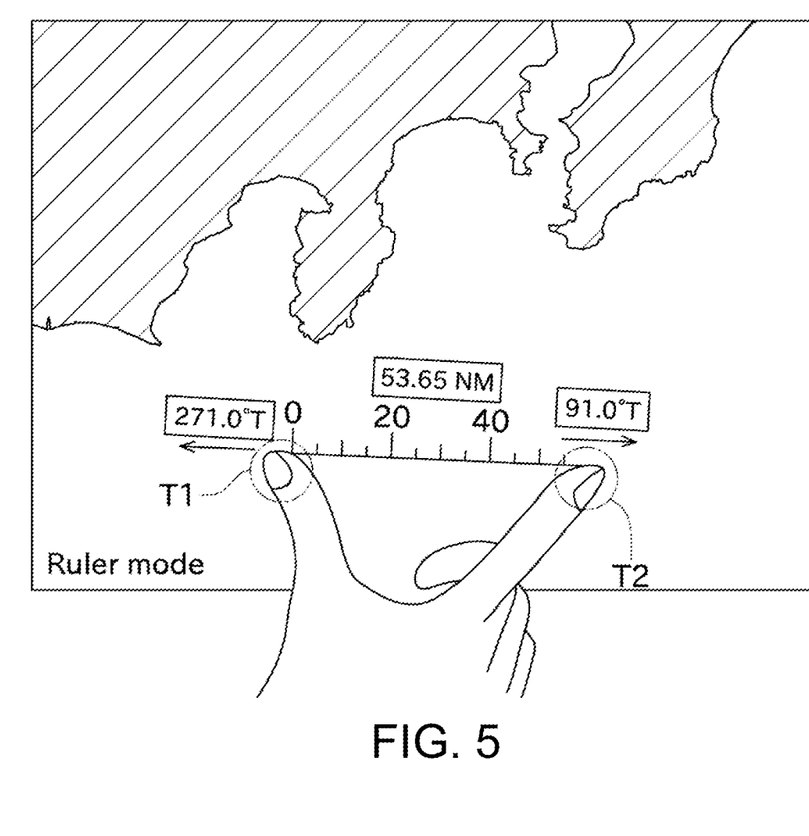
FIG. 5 is a view illustrating a display screen when point-to-point information is displayed in another embodiment.
Figure 6:
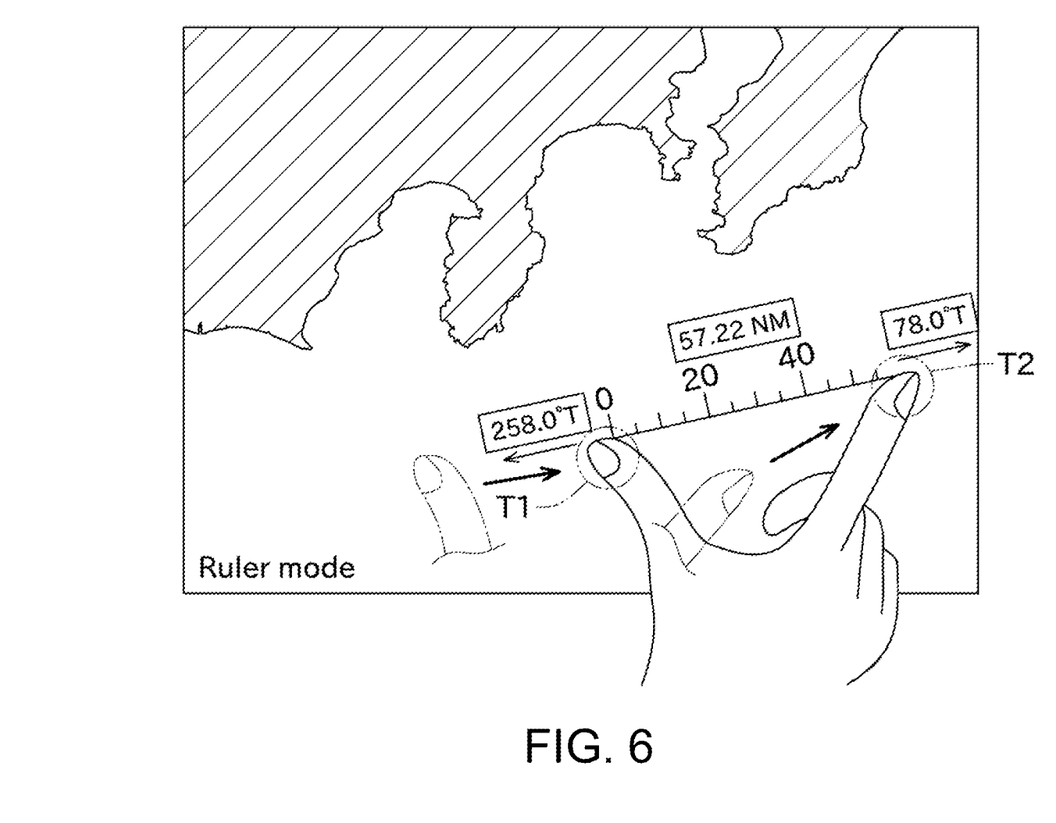
FIG. 6 is a view illustrating the display screen when both of touches are moved in the other embodiment.
Figure 7:
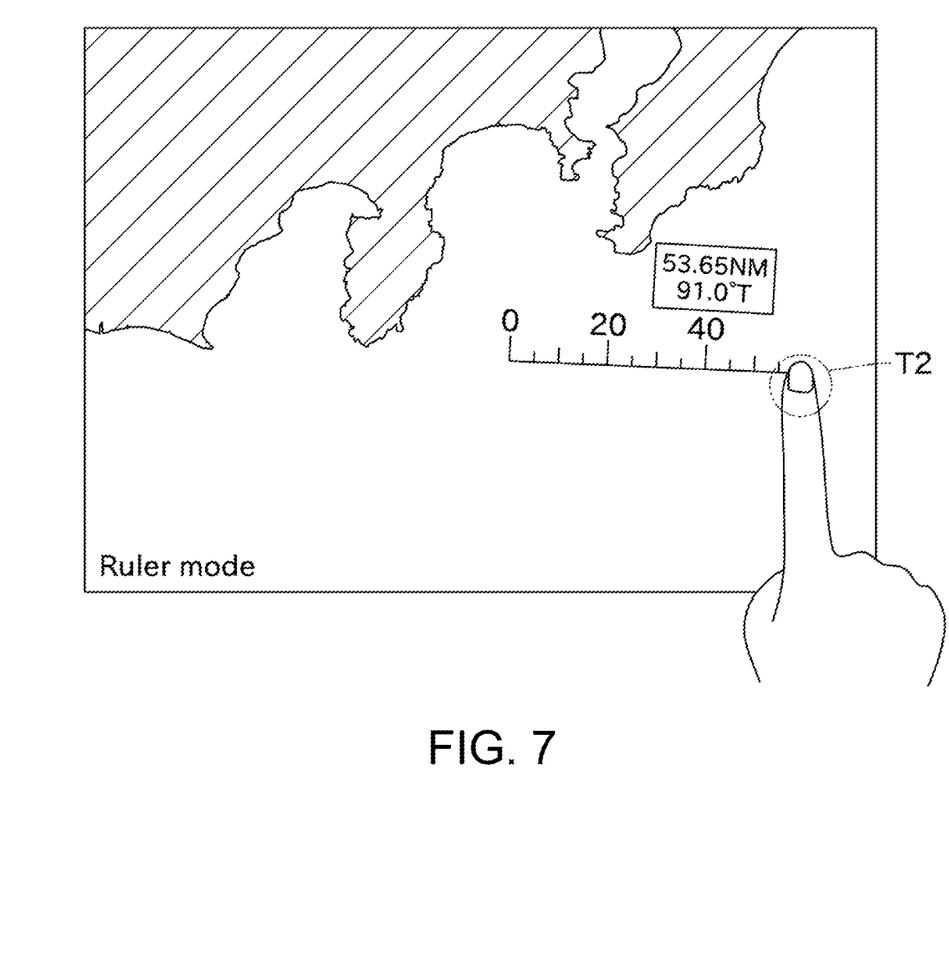
FIG. 7 is a view illustrating the display screen when one of the touches is separated from the display screen in the other embodiment.

Next, a configuration for displaying by a touch operation a distance and azimuths between two positions on the nautical chart is described with reference to FIGS. 3 and 4. FIGS. 3 and 4 are views illustrating the display screen displaying the distance and the like between the two positions on the nautical chart. Note that, hereinafter, the relation of information between the two positions on the image (the nautical chart in this embodiment), such as the distance and the azimuths between the two positions on the nautical chart, may be referred to as "the point-to-point information."

With the touch panel device 11 of this embodiment, by two arbitrary positions on the nautical chart being touched by the operator with his/her fingers (a first touch T1 and a second touch T2 illustrated in FIG. 3), the point-to-point information is displayed on the display screen as illustrated in FIG. 3. Hereinafter, processing performed by the touch panel device 11 to display the point-to-point information and a scale is described. The controller 25 acquires the positions (specifically, the positions on the display panel) of the touches at the two positions from the detector 24. Based on this, the controller 25 can obtain which coordinates on the image (nautical chart) the respective touched positions correspond to. Next, on the basis of the scale size of the nautical chart, the controller 25 obtains the actual distance between the touched positions based on the distance between the touched positions on the image. Moreover, based on a rotational angle of the nautical chart, the controller 25 obtains the azimuth of the position of the second touch T2 seen from the position corresponding to the first touch T1 (and the azimuth of the other way around). Then, the controller 25 displays the scale based on the scale size of the nautical chart between the two touched positions, along with the obtained distance and the azimuths (point-to-point information).

Note that, the method of obtaining the actual distance and the azimuths between the touched positions is arbitrary, and for example, a configuration may be adopted, in which latitudes and longitudes on the nautical chart which correspond to the two touched positions are acquired based on the nautical chart information stored in the memory 23, and the actual distance and the azimuths between the two positions are obtained based on the acquired latitudes and longitudes.

Thus, in this embodiment, the operation of specifying the positions and the operation of displaying the point-to-point information can be performed in one action. Therefore, the operator can easily and swiftly acquire the information.

Moreover, when one or both of the first touch T1 and the second touch T2 are no longer detected (when the fingers are separated from the display screen), the controller 25 performs processing of deleting the point-to-point information from the display screen. Then when touches at two positions are detected again, the point-to-point information based on the touched positions is displayed. Thus, the operator can swiftly switch the point-to-point information between displayed and not displayed. Therefore, suitable action can be provided, for example, in a case where it is desired to check the nautical chart and the point-to-point information alternately, or in a case where it is suddenly required to check the nautical chart.

Moreover, the operator, by separating the finger of one of the first touch T1 and the second touch T2 and again touching a predetermined position while remaining the finger of the other touch contacting the display screen, can acquire the point-to-point information using the position of the one of the touch T1 and the second touch T2 as a reference (see FIG. 4). This operation can be clearly differentiated from the pinch operation in view of separating the finger from the display screen once, and then touching it again.

Next, another embodiment is described with reference to FIGS. 5 to 8. FIGS. 5 to 8 are views illustrating the display screen displaying the distance and the like between the two positions on the nautical chart. In this embodiment, a ruler mode in which the point-to-point information and the like are displayed is provided. In this ruler mode, the pinch operation is not required to be associated with the change of the scale of the nautical chart, and therefore, more user-friendly operation can be achieved.

For example, when a predetermined touch operation (operation in which the touches at the two positions continue over a predetermined period of time) or a predetermined operation using the user interface 22 is performed, the controller 25 performs processing of shifting to the ruler mode. In the ruler mode, it is displayed in, for example, the bottom-left corner of the display screen, that the mode is the ruler mode (see FIG. 5).

When the touches at the two positions are detected, similarly to the above embodiment, the controller 25 performs a control to display the point-to-point information. Moreover, in the ruler mode, by performing the drag operation, the point-to-point information is updated following the touched positions (see FIG. 6). The drag operation may be such that one of the touches is moved (dragged) while the other touch is fixed, or both of the touches are moved (dragged) simultaneously.

Moreover, in the ruler mode, even when the operator separates the finger of one of the touches from the display screen in the state where the point-to-point information is displayed, the point-to-point information is shifted to not-displayed. That is, when the finger of one of the touches is separated from the display screen, a single position of the point-to-point information is fixed to the touched position immediately before the finger is separated (see FIG. 7). Then, when the operator moves, by dragging, the finger of the side that the contact with the display screen is continued with, the controller 25 displays the point-to-point information to follow the change of the position of the remained touch by using the touched position on the side where the finger is separated from the display screen as a reference (see FIG. 8). In this case, since the position of the reference side is more definite between the two positions, for the azimuth, differently from the case of FIG. 3, only the azimuth of the target position (the second touch T2 in the drawing) seen from the reference position (the touch of the side where the finger has been separated from the display screen, the first touch T1 in the drawing) is displayed, as illustrated in FIG. 8.

Figure 8:
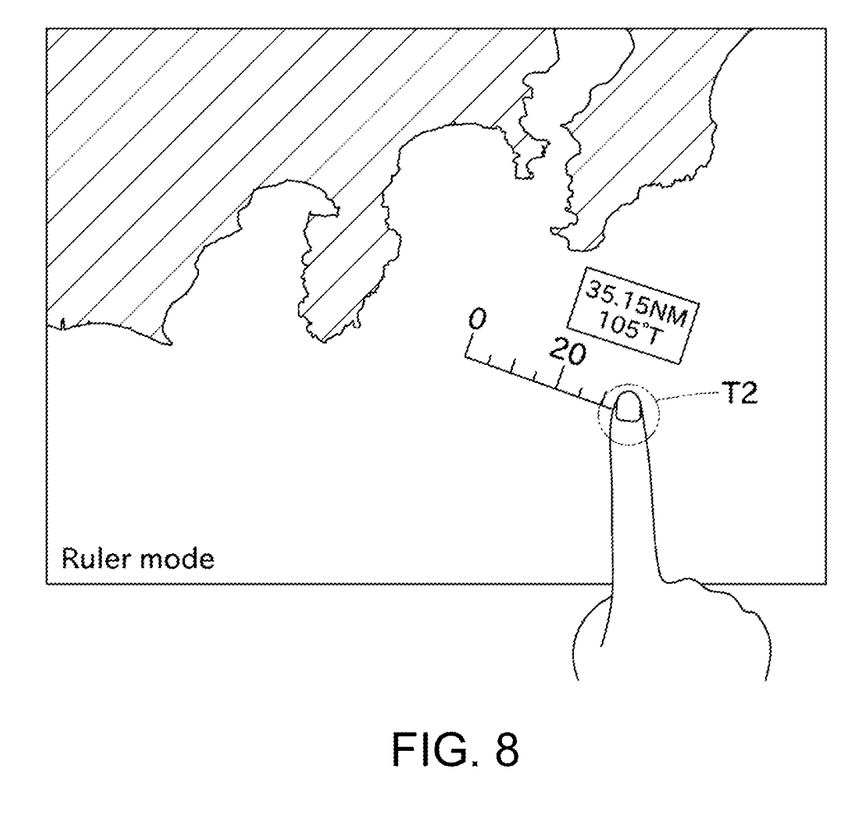
FIG. 8 is a view illustrating the display screen when the remained touch is moved in the other embodiment.

Note that, a configuration may be adopted, in which in the state illustrated in FIG. 8, by performing a new touch and separating the touch pointing the target position, the finger specifying the target position is switched. Moreover, a configuration may be adopted, in which in the state illustrated in FIG. 8, by performing a new touch and performing the drag operation by the new touch, the fineness of the scale is changed.

Note that, the controller 25 of this embodiment is configured to perform the processing described above only in the ruler mode in order to prevent interference with, for example, the pinch operation; however, for example, in a case where the pinch operation is not used, the processing described above may be achieved with a touch panel device 11 that does not have the ruler mode.

As described above, the touch panel device 11 of this embodiment includes the display unit 21, the detector 24, and the controller 25. The display unit 21 displays the image (nautical chart) on the display screen. The detector 24 detects the touches at the two positions on the display screen and the touched positions thereof. The controller 25 displays the distance and the azimuths between the touched positions on the display unit 21 based on the two touched positions detected by the detector 24 and either one of the coordinates on the image corresponding to the touched positions and the information associated with the coordinates (positional information).

Thus, the operator can grasp a distance and azimuths between two desired touched positions with simple operation. Moreover, since the configuration in which the positions are specified with the touch operation is adopted, the operator can grasp the relation between the two positions with instinctive operation.

Although the preferred embodiments of the present invention is described above, the above configuration may be modified as follows, for example.

In the above embodiment, the touch panel device is configured to display the distance and the azimuth(s) as the point-to-point information; however, the point-to-point information is not limited to these. For example, a configuration may be adopted, in which a water temperature, a water depth, an altitude, an atmospheric pressure and the like are acquired or, in advance, stored in association with the coordinates on the image (nautical chart), and differences thereof between the two positions are displayed as the point-to-point information. Other than this, a configuration may be adopted, in which a time difference between the touched positions is displayed as the point-to-point information.

Figure 9:
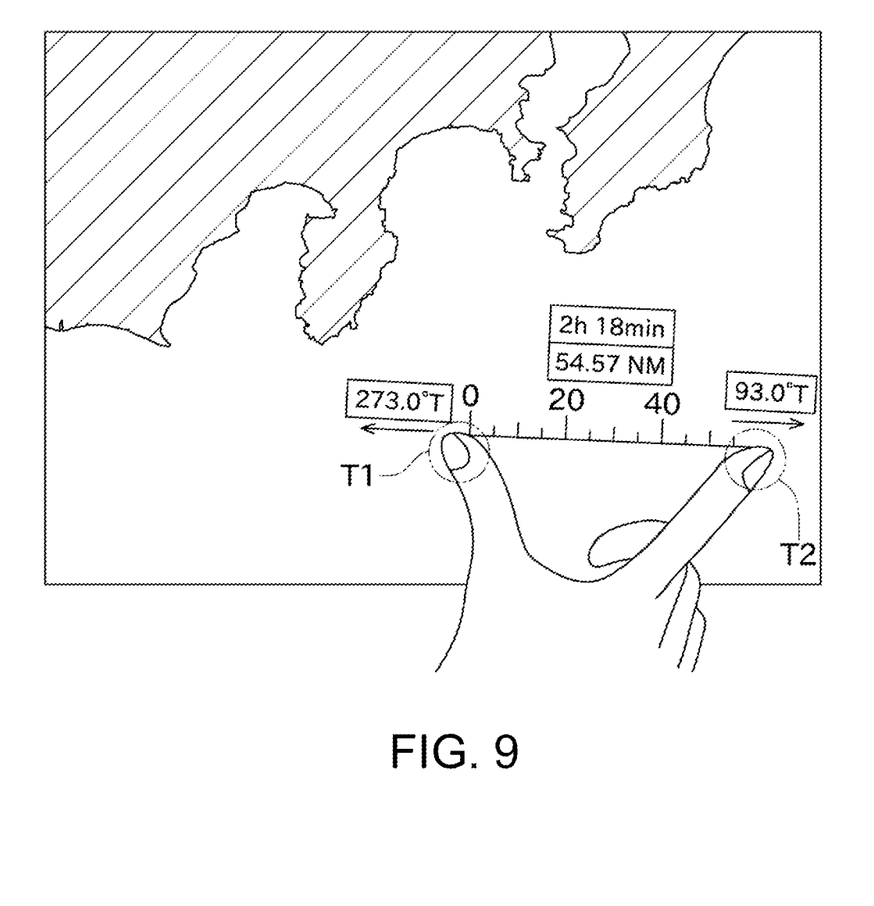
FIG. 9 is a view illustrating the display screen when a period of time required to travel between the two positions is displayed as the point-to-point information.

Further, as illustrated in FIG. 9, a configuration may be adopted, in which the time period required to travel between the two positions is displayed in addition to (or alternative to) the distance between the two positions. Note that, the time period required to travel between the two positions can be obtained based on the distance between the two positions and either one of a current ship speed and an average ship speed within a predetermined period of time.

Moreover, the present invention may be applied to the second sensor image 32 and the third sensor image 33, other than the nautical chart as the first sensor image 31. For example, by the operator touching predetermined two positions of the second sensor image 32, the distance, the azimuths, a difference of echo intensities between the two positions, and the like can be displayed. Moreover, by the operator touching predetermined two positions of the third sensor image 33, a difference of the water depths, a time difference, the difference of the echo intensities, and the like can be displayed.

The scale of the point-to-point information may be displayed, not only between the touched positions, but also outside thereof. That is, a configuration may be adopted, in which a straight line coupling the touched two positions is suitably extended and the scale of the extended part is displayed.

In accordance with displaying the point-to-point information, a plurality of concentric circles centering on one of the two touched positions may be depicted with a predetermined interval.

In the above embodiment, the embodiment in which the GPS is used as one example of the GNSS is described; however, needless to say that a configuration in which other kind of GNSS is used may be adopted.

The touch panel device 11 of this embodiment is a general display device which receives information from a plurality of sensors and displays it; however, the present invention may also be applied to a display device which displays mainly one kind of information (e.g., nautical chart information). Moreover, the present invention may also be applied to, for example, a plotter apparatus which can display a nautical chart, a radar apparatus which is able to display a radar image.

The touch panel device may be, other than the display device installed in ships, a display device (e.g., a navigation device) installed in movable bodies such as automobiles and aircrafts, a tablet PC, a smart phone, a handheld terminal, etc. For example, as a navigation device, similarly to the above embodiment, the present invention may be utilized, for example, to display a distance between two positions on a map. Moreover, as a tablet PC and the like, the present invention may be utilized, for example, in an image editing application, to display, on an image opened for editing, a distance and an angle between two arbitrary positions specified by an operator. Moreover, as a display device and the like which acquire and display sensor information, such as temperature distribution, a luminosity difference and the like, the present invention may be utilized to display a difference of temperatures and a difference in luminosity between the two positions.

DESCRIPTION OF REFERENCE NUMERAL(S)

1 Ship Instrument Network System
10 Ship Network
11 Touch Panel Device (Device having Touch Panel)
12 GPS Antenna (GNSS Sensor)
13 Radar Antenna
14 Fish Finder
15 Heading Sensor
16 Autopilot Device
21 Display Unit
22 User Interface
23 Memory
24 Detector
25 Controller

What is claimed is:

1. A device having a touch panel that is touched by an operator, comprising:
a display unit configured to display an image on a display screen;
a detector configured to detect touches from the operator on the touch panel at two positions on the display screen and touched positions thereof; and
a controller configured to display, on the display screen, point-to-point information indicating relation of information between the touched positions based on the two touched positions that are detected by the detector and either one of coordinates on the image corresponding to the touched positions and information associated with the coordinates,
wherein when the detector detects a change of one or more of the touched positions, the controller displays the point-to-point information on the display unit based on the changed one or more of the touched positions only if:
- the device is operating in a ruler mode; or
- a touch is released at the one or more of the touched positions before the operator contacts the display screen again at the changed one or more of the touched positions.

2. The device having the touch panel of claim 1, wherein when the device is not operating in the ruler mode and no touch is released at the one or more of the touched positions before making contact with the touch panel again at the changed one or more of the touched positions, the controller identifies a pinch operation for changing a scale of the image.

3. The device having the touch panel of claim 1, wherein the controller displays, at least between the two positions, a scale indicating a value of the information associated with the coordinates.

4. The device having the touch panel of claim 1, wherein when the detector no longer detects either (a) one of the touches at one of the two positions or (b) the touches at the two positions, the controller erases the point-to-point information from the display unit.

5. The device having the touch panel of claim 1, wherein the display unit displays either one of a map and a nautical chart, and
wherein the controller displays on the display unit, as the point-to-point information, a distance from one of the touched positions to the other touched position and an azimuth indicated by a line coupling the two touched positions.

6. The device having the touch panel of claim 1, wherein the display unit displays either one of a map and a nautical chart, and
wherein the controller displays on the display unit, as the point-to-point information, a period of time required to move a distance from one of the touched positions to the other touched position.

7. The device having the touch panel of claim 1, comprising a memory configured to store nautical chart information,
wherein the controller displays a position of a ship on a nautical chart based on positional information received from a GNSS sensor.

8. A radar apparatus, comprising the device having the touch panel of claim 7.

9. A plotter apparatus, comprising the device having the touch panel of claim 7.

10. A ship network system, comprising the device having the touch panel of claim 7.

11. An information displaying method, comprising:
displaying an image on a display screen;
detecting touches from an operator on a touch panel at two positions on the display screen and touched positions thereof;
displaying, on the display screen, point-to-point information indicating relation of information between the touched positions based on the two touched positions that are detected by the detecting the touches and either one of coordinates on the image corresponding to the touched positions and information associated with the coordinates; and
when a change of one or more of the touched positions is detected, displaying the point-to-point information on the display screen based on the changed one or more of the touched positions only if:
operating in a ruler mode; or
a touch is released at the one or more of the touched positions before the operator contacts the display screen again at the changed one or more of the touched positions.

12. An information displaying program of causing a computer to:
display an image on a display screen;
detect touches from an operator on a touch panel at two positions on the display screen and touched positions thereof; and
display, on the display screen, point-to-point information indicating relation of the information between the touched positions, based on the two touched positions that are detected by the detecting the touches and either one of coordinates on the image corresponding to the touched positions and information associated with the coordinates; and
when a change of one or more of the touched positions is detected, display the point-to-point information on the display screen based on the changed one or more of the touched positions only if:
the computer is operating in a ruler mode; or
a touch is released at the one or more of the touched positions before the operator contacts the display screen again at the changed one or more of the touched positions.

* * * * *